United States Patent
Smith (10) Patent No.: US 10,942,690 B2
(45) Date of Patent: Mar. 9, 2021

(54) SYSTEM AND METHOD FOR IMPLEMENTING A COLOR SHIFT SECURITY FEATURE IN A PRINT JOB

(71) Applicant: Xerox Corporation, Norwalk, CT (US)

(72) Inventor: Mark A. Smith, Rochester, NY (US)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 15/605,543

(22) Filed: May 25, 2017

(65) Prior Publication Data

US 2018/0341444 A1 Nov. 29, 2018

(51) Int. Cl.
| | |
|---|---|
| *G06F 3/12* | (2006.01) |
| *H04N 1/60* | (2006.01) |
| *H04N 1/00* | (2006.01) |
| *H04N 1/54* | (2006.01) |

(52) U.S. Cl.
CPC .......... *G06F 3/1238* (2013.01); *G06F 3/1222* (2013.01); *G06F 3/1253* (2013.01); *G06F 3/1285* (2013.01); *H04N 1/0087* (2013.01); *H04N 1/00846* (2013.01); *H04N 1/54* (2013.01); *H04N 1/6008* (2013.01); *G06F 3/1205* (2013.01); *G06F 3/1208* (2013.01); *H04N 2201/0082* (2013.01)

(58) Field of Classification Search
CPC ............................. G06F 3/1238; H04N 1/0087
See application file for complete search history.

(56) References Cited

U.S. PATENT DOCUMENTS

| | | | |
|---|---|---|---|
| 8,913,311 B1 * | 12/2014 | Sanchez | H04N 1/6058 358/518 |
| 8,923,710 B2 | 12/2014 | Robinson et al. | |
| 9,204,013 B2 | 12/2015 | Robinson et al. | |
| 9,229,348 B2 | 1/2016 | Robinson et al. | |
| 9,229,407 B1 | 1/2016 | Robinson et al. | |
| 2005/0156965 A1 * | 7/2005 | Hoshino | B41J 2/2114 347/9 |
| 2006/0133870 A1 * | 6/2006 | Ng | G03G 15/2064 399/341 |
| 2007/0244219 A1 * | 10/2007 | Vaidya | C09D 11/03 523/160 |
| 2014/0322645 A1 * | 10/2014 | Tombs | G03G 15/6582 430/124.13 |

OTHER PUBLICATIONS

Specialty Imaging Text, Xerox Corporation, Sep. 2013.

* cited by examiner

*Primary Examiner* — King Y Poon
(74) *Attorney, Agent, or Firm* — Fay Sharpe LLP (57) ABSTRACT

A color shift security feature is provided. In at least one form, a clear colorant is used to add content to a document to provide a visual indication if the document is printed on a printer with self-limiting behavior. In this manner, in at least one form, it can be determined if a document is authentic, secure and/or authorized.

20 Claims, 7 Drawing Sheets

SYSTEM AND METHOD FOR IMPLEMENTING A COLOR SHIFT SECURITY FEATURE IN A PRINT JOB

BACKGROUND

Conventional printer devices support four colorant housings: cyan, magenta, yellow, and black ("CMYK"). Conventional devices utilize these four particular colorants because, traditionally, different CMYK combinations can produce the greatest number of colors using the least amount of colorant (for example, toner). This benefit caused the CMYK printing process, using subtractive color mixing, to become the standard in the printing industry.

Recent printer devices are configured to support a fifth colorant housing. The extra housing (cartridge) can contain a toner for a fifth color different from CMYK, such as, for example, red, or a magnetic ink used in Magnetic Ink Character Recognition ("MICR") printing. Certain ones of these printer devices can support any made-to-order colorant.

Page Description Language ("PDL") files can provide the printer devices with color separation information. Color separation is the act of decomposing a digital image into single color layers (e.g., in four basic CMYK process colors) for rendering the image in an offset printing process. Each single color layer is printed separately, one on top of the other, to collectively give the impression of a desired color.

For the recently developed printer devices capable of utilizing five colorant housings (herein referred to as "CMYKX"), a desired color previously rendered using a select combination of CMYK colorants may also be achieved using different combinations of two, three, or four CMYKX colorants, each including the fifth colorant X. Alternatively, the fifth colorant X may be a specialty colorant such as Clear, Gold, Silver or White.

BRIEF DESCRIPTION

In one aspect of the presently described embodiments, a system for providing a color shift security feature to a print job, the system including a self ink limiting feature, the system comprises an input configured to receive a print job and indication to apply the color shift security feature to the print job, a processor configured to determine that the color shift security feature is to be applied to the print job, selectively turn off a clear colorant ink limiting feature to implement the color shift security feature in the print job, wherein a color combination to be printed includes a clear colorant used to selectively shift color hue, and, a marking engine configured to print the print job with the color shift security feature embedded therein.

In another aspect of the presently described embodiments, the processor is configured to turn off the clear colorant ink limiting feature for an entire print job.

In another aspect of the presently described embodiments, the color combination to be printed comprises at least one pre-defined spot color.

In another aspect of the presently described embodiments, the clear colorant ink limiting feature is selectively turned off only for the at least one pre-defined spot color.

In another aspect of the presently described embodiments, the clear colorant ink limiting feature is turned on for colors other than the at least one pre-defined spot color.

In another aspect of the presently described embodiments, the pre-defined spot color comprises a 100% clear component.

In another aspect of the presently described embodiments, the indication to apply the color shift security feature is added by a user.

In another aspect of the presently described embodiments, the system is a five-color printing system. It should also be appreciated that the presently described embodiments may be adapted for use in an N-color self ink limiting device.

In another aspect of the presently described embodiments, the print job with the color shift security feature embedded therein facilitates a determination of authenticity, authorization, or security for the print job in subsequent renderings of the print job.

In another aspect of the presently described embodiments, a method providing a color shift security feature to a print job, wherein a printer used for printing includes a self ink limiting feature, the method comprises receiving a print job and an indication to apply the color shift security feature to the print job, determining that the color shift security feature is to be applied to the print job; selectively turning off a clear colorant ink limiting feature to implement the color shift security feature in the print job, wherein a color combination to be printed includes a clear colorant used to selectively shift color hue, and, printing the print job with the color shift security feature embedded therein.

In another aspect of the presently described embodiments, the selectively turning off comprises turning off the clear colorant ink limiting feature for an entire print job.

In another aspect of the presently described embodiments, the color combination to be printed comprises at least one pre-defined spot color.

In another aspect of the presently described embodiments, the selective turning off of the clear colorant ink limiting feature comprises turning off only for the at least one pre-defined spot color.

In another aspect of the presently described embodiments, the method further comprises turning on the clear colorant ink limiting feature for colors other than the at least one pre-defined spot color.

In another aspect of the presently described embodiments, the pre-defined spot color comprises a 100% clear component.

In another aspect of the presently described embodiments, the method further comprises adding the indication to apply the color shift security feature by a user.

In another aspect of the presently described embodiments, a printer used for printing is a five-color printing system.

In another aspect of the presently described embodiments, the method further comprises subsequently rendering the print job such that the color hue shift is not perceivable, thus indicating that the subsequently rendered print job is unauthorized, inauthentic or insecure.

DETAILED DESCRIPTION

The presently described embodiments relate to a method and/or system for providing an embedded security feature in a print job. More specifically, the presently described embodiments relate to providing a color shift security feature to a print job. In at least one form, the color shift security feature is implemented by selecting "clear" as a fifth colorant in a five color printing scheme that uses a self ink limiting printer. According to the presently described embodiments, in at least one form, use of the clear colorant as described in connection with selected operation of the printer results in a color or hue shift for printed material. Such color or hue shift consequently provides a security or authentication feature that will allow for detection of subsequently rendered (e.g. copied or printed) versions of the print job that are unauthorized, inauthentic or insecure.

Figure 1:
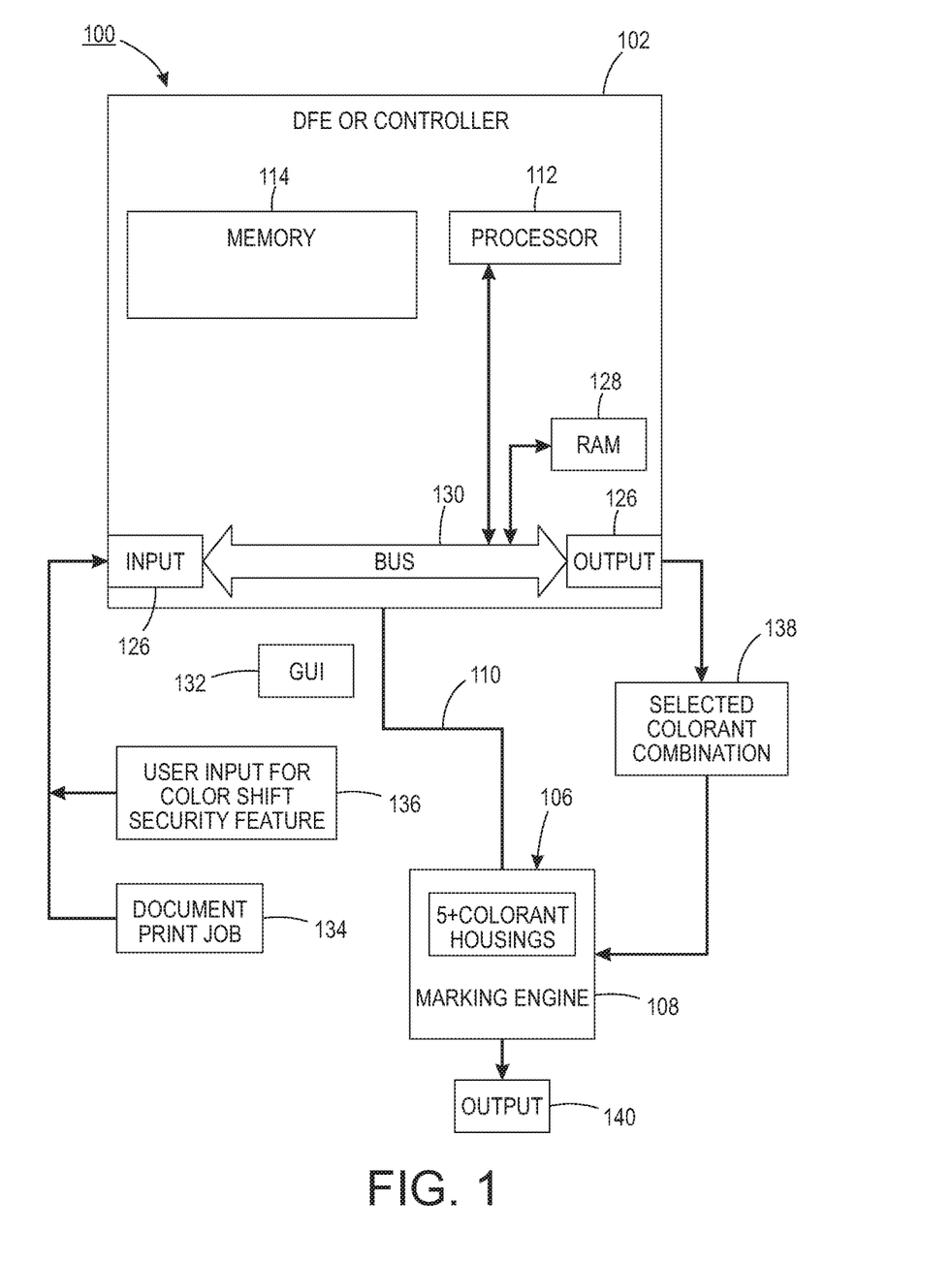
FIG. 1 is a system incorporating the presently described embodiments.

FIG. 1 is a schematic illustration of an example system 100 for usage in a five-colorant capable printer, capable of implementing the presently described embodiments. Although a five-colorant capable system is shown, the presently described embodiments may be implemented in an N-colorant (e.g. 6-colorants) system with a self ink limiting printing device as well.

As shown, the printing system 100 may include a controller 102, such as a digital front end ("DFE") or controller, and an image forming apparatus or printer device 106, including a marking engine or similar rendering device 108, which are linked together by communication links 110, referred to herein as a network. These components are described in greater detail below.

The DFE or controller 102 illustrated in FIG. 1 includes a processor 112, which controls the overall operation of the system by execution of processing instructions, which are stored in memory 114 connected to the processor 112.

In general, the system 100 operates based on a document, or print job, 134 and instructions provided in or to the system 100 for rendering the document, and considers a user-selection (optionally) 136 received (in some examples through GUI 132) for applying a color shift security feature according to the presently described embodiments, to provide a selected colorant combination 138 to the printer device 106 for rendering the output 140.

The DFE or controller 102 includes one or more communication interfaces (I/O), such as network interfaces 126 for communicating with external devices, such as printer device 106. The various hardware components 112, 114, (random access memory "RAM") 128 may all be connected by a bus 130.

With continued reference to FIG. 1, the DFE or controller 102 is communicatively linked to a user interface device (GUI) 132 via a wired and/or wireless link. In various embodiments, the user interface device 132 may include one or more of a display device, for displaying information to users, and a user input device, such as a keyboard or touch or writable screen, for inputting instructions and/or receiving status information, and/or a cursor control device, such as a mouse, trackball, or the like, for communicating user input information and command selections to the processor 112. Specifically, the user interface device 132 includes at least one of an input device and an output device, both of which include hardware, and which are communicatively linked with the DFE or controller 102 via wired and/or wireless link(s).

As mentioned, the DFE or controller 102 is communicatively linked with the printer 106 via link 110. The exemplary printers 106 may each include the marking engine 108, which applies marking medium, such as ink or toner, to a substrate, such as paper, using, for example, a laser, inkjet, thermal, or other transfer process. The printer 106 renders images on print media, such as paper, and can be a copier, laser printer, bookmaking machine, facsimile machine, or a multifunction machine (which includes one or more functions such as scanning, printing, archiving, emailing, and faxing).

The memory 114, 128 may represent any type of tangible computer readable medium such as random access memory (RAM), read only memory (ROM), magnetic disk or tape, optical disk, flash memory, or holographic memory. In one embodiment, the memory 114, 128 may each comprise a combination of random access memory and read only memory. The digital processor 112 can be variously embodied, such as by a single-core processor, a dual-core processor (or more generally by a multiple-core processor), a digital processor and cooperating math coprocessor, a digital controller, or the like. The digital processors 112 in addition to controlling the operation of the DFE or controller 102, executes instructions stored in the memory 114 for performing the parts of the method outlined below.

Software modules that may be stored in memory 114, are intended to encompass any collection or set of instructions executable by the system 100 so as to configure the system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on the server or other location to perform certain functions.

The communication interfaces 126 may include, for example, a modem, a router, a cable, and/or Ethernet port, etc.

As will be appreciated, while the DFE or controller 102 and printer 106 are illustrated by way of example, the system 100 may be hosted by fewer or more linked computing devices. Each computing device may include, for example, a server computer, desktop, laptop, or tablet computer, smartphone or any other computing device capable of implementing the method described herein.

As mentioned, the DFE or controller 102 selects a colorant combination for rendering each object in the print job. "Object" may refer to a partial segment in a full, multi-color image, a full (single-color) image on a page, a page/sheet (e.g., in a single color), or the entire document upon which the selection is performed. For example, embodiments are contemplated where the selection can be performed on a page or document basis. Each "object" is associated with a desired color included in or added into the job data, which is provided with the print instruction.

Certain printers (e.g. some Xerographic printers), such as a system 100, use an Image On Image (IOI) technology which has the interesting characteristic that the technology is 'self ink limiting'. In other words, such an IOI printer will develop only a certain amount of total ink from all separations, and no more. For example, the Digital Front End (DFE) could provide the printer with CMYK print-ready images containing 400% ink. (i.e. each separation specifies 100% ink). However, when such images print, the IOI technology limits the amount of ink developed to some lesser amount—say 280%.

For normal CMYK printing, the DFE employs a Destination Profile that models the printer's color response (including the printer's self ink limiting). The Destination Profile is built from measurements obtained from test patches printed on the printer. Therefore, the Destination Profile itself is effectively ink limited. That is to say, images built from the Destination Profile will never ask for more ink than the printer is capable of printing.

Figure 2:
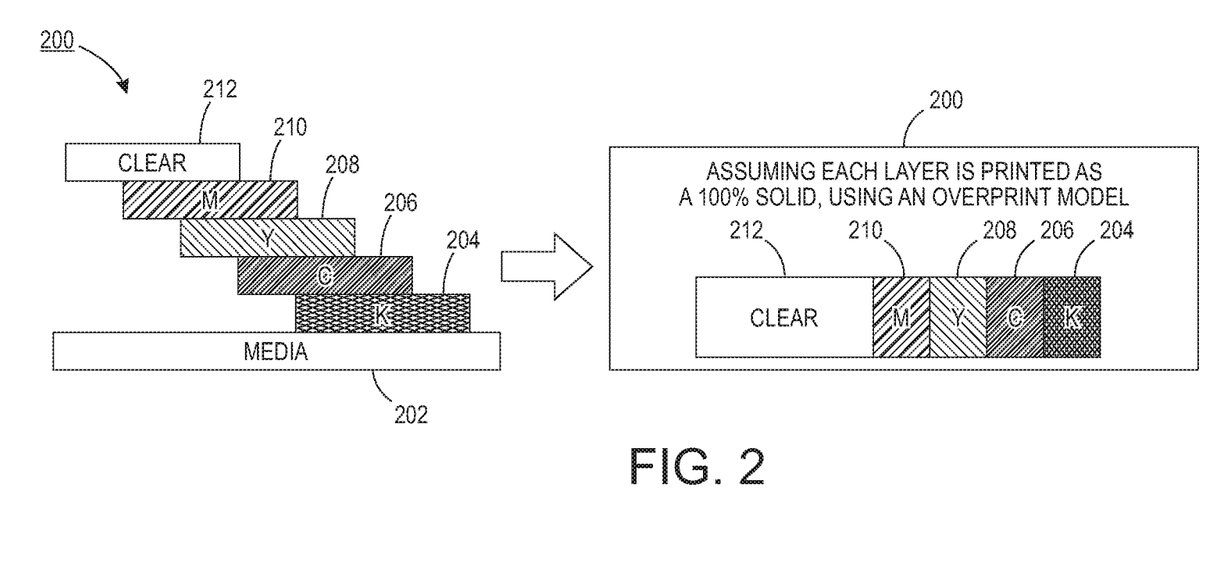
FIG. 2 is a representative view of a 5-color printing example.

Adding a $5^{th}$ separation with a 'Clear' colorant is implemented in this environment. In at least one form, the Clear colorant is applied first in the determination of the appropriate color combination to be printed to complete a requested print job. FIG. 2 shows an example of a printed 5-color patch 200 formed on a media 202. As illustrated, the patch is formed of CMYK color separations black 204, cyan 206, yellow 208 and magenta 210. Also shown is a clear separation 212.

Because of the printer's self ink limiting behavior, application of the Clear spot colorant will consume ink that will reduce the amount available for the CMYK portion of the image. Consider an object of color with the following color combination: [0, 90, 90, 100]. This will result in an image with a first or Brown hue. However, application of 100% Clear might reduce the total ink available for CMYK from 280% to 180%. Such a change in the CMYK results in substantial hue shifts. By the time the printer is able to develop the colorant separations applied latest in the sequence, the ink limit will be exhausted. In this regard, if the object has 100% clear colorant applied first and then consequently is printed at [0,90,90,0] because of the noted self ink limiting characteristics of the printer, it will have a second or Orange hue.

Accordingly, the DFE uses a technique to prevent this hue shift from occurring. The DFE algorithm selectively reduces the amount of clear ink that may be used for any pixel that would otherwise exceed the printer's ink limit. For example, the present DFE may reduce the amount of Clear colorant to zero. The idea is that it is more important to print objects without a hue shift than it is to print those objects with Clear colorant.

The presently described embodiments exploit this behavior to add security features to documents. That is, the presently described embodiments "turn off" the clear colorant limiting features of the DFE to achieve these security features. In this scenario, in at least one form, the designer of the PDL print job controls the behavior of the printer with respect to hues, and includes objects in the PDL of colors that will respond correctly when Clear is applied to them. It is also in the control of the designer to include PDL callouts for Clear to be printed over certain objects. So, in this scenario, Clear would not be used unless a designer wished to achieve a hue shift.

The idea is to add content to electronic documents that will provide a visual indication if the document is printed on 1) a printer without the self limiting behavior; or printed on 2) a printer with a different self limiting behavior. If the document is printed, using machines such as 1) or 2), the result will be an easily perceived unauthorized, inauthenticate or insecure document.

Figure 3:
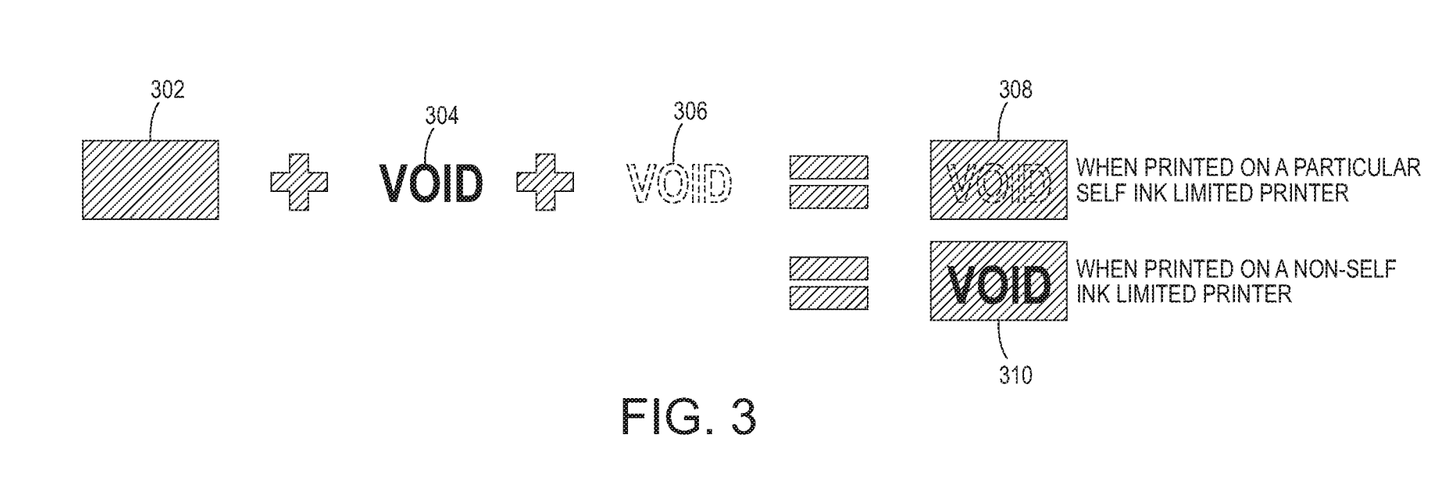
FIG. 3 shows an example according to the presently described embodiments.

An implementation of this technique according to the presently described embodiments is illustrated in FIG. 3. As shown, a PDL document is considered which is created to have a text string ("VOID") 304 in a first hue, such as the Brown hue described above, printed on top of a rectangular object 302 of a second hue, such as the Orange hue described above. Additionally, a matching text string ("VOID") 306 is applied over the text string ("VOID") 304 using the Clear colorant. The result 308 is shown. More particularly, when the PDL document containing this construction is printed using the authorized self ink limited printer, the result 308 will include a hue shift in the original first hue text string to exactly match the second hue of the rectangular object. Accordingly, the original printed document is authenticated by virtue of the authorized print process according to the presently described embodiments and the machine that prints the document.

However, if the same document is printed on an unauthorized machine such as a non-self ink limited printer, as might occur if an un-authentic or unauthorized copy is printed, a result 310 is achieved where there is no hue shift in the first hue or Brown text, and the word "VOID" will appear prominently on the second hue, or orange hue, background. This invalidates the un-authentic, unauthorized or insecure printed document.

When an authentic printed document is copied, the copy will not contain clear colorant and, hence, it will be missing the word VOID printed in clear text. The absence of this word may be observed by tilting the inauthentic copy to the light and observing no shift in gloss level where the word should be.

Figure 4:
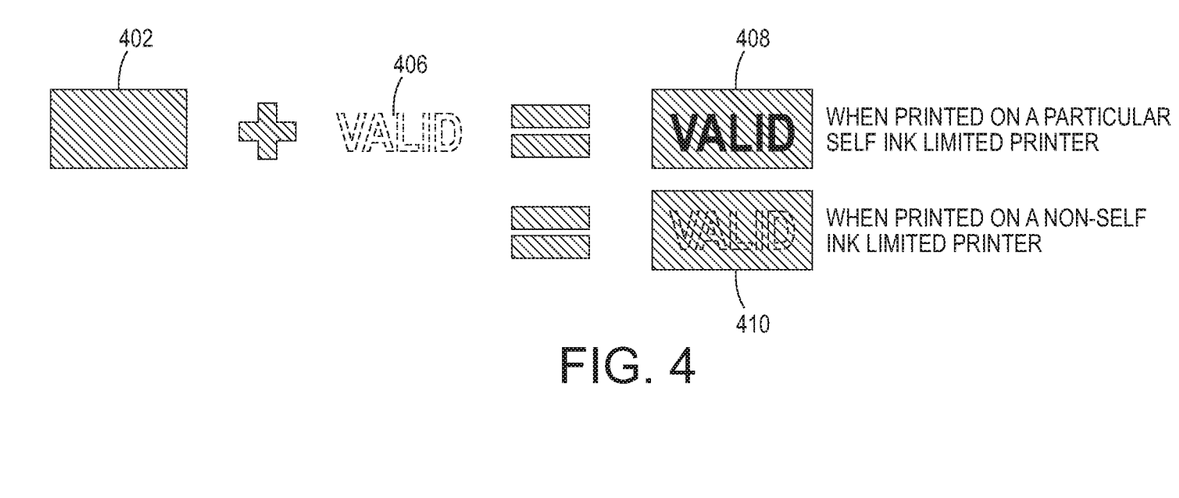
FIG. 4 shows an example according to the presently described embodiments.

Alternately, in another implementation, the PDL document could be created as shown in FIG. 4. A background 402 in the first hue, or Brown hue, is combined with a text string ("VALID") 406 in a clear colorant. This provides the hue or color shift contemplated herein. Thus, when printed on an authorized self ink limited printer, a result 408 shows the word "VALID" in the second hue, or orange hue, appearing prominently on the background in the first hue. Of course, this provides a measure of authentication or validation for the printed document.

However, if the construction is printed on an unauthorized non-self ink limited printer, as might occur if an un-authentic or unauthorized copy is printed, a color shift does not occur so only the background color prints as shown at 410—thus invalidating the printed document (because the word "VALID" does not appear).

It can be appreciated that the same effect occurs with many different color combinations than the two described above. It can also be appreciated that the effect also occurs if the document is printed on a printer with a different self limiting behavior than the target printer. The exact amount and direction of the hue shift will depend on this different printer's separation printing order and xerographic characteristics.

Figure 5:
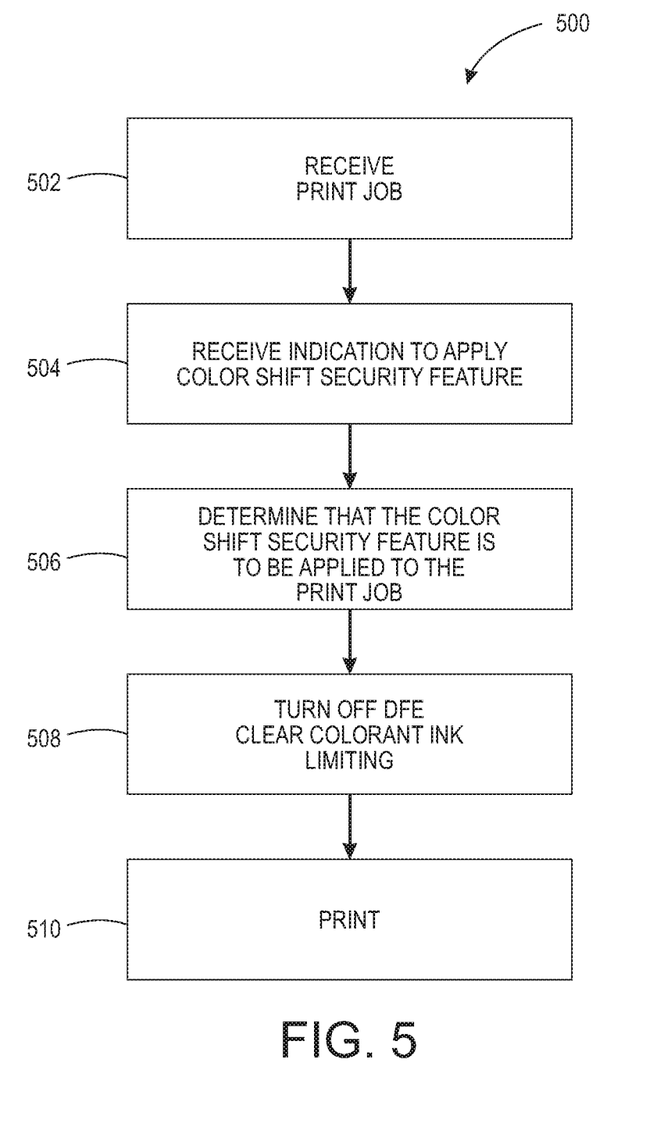
FIG. 5 is a flowchart illustrating a method according to the presently described embodiments.

With reference to FIG. 5, an example method according to the presently described embodiments is illustrated. Such a method may be implemented in a variety of manners and environments using a variety of hardware and/or software implementations, such as implementations contemplated by the system 100 and its functionality. It should also be appreciated that the method of FIG. 5 may be adapted to, for example, the implementations of FIG. 3 or 4, or others.

As shown, a method 500 commences upon receipt of a print job (at 502) and receipt of an indication to apply a color shift security feature to the print job (at 504). Next, the system 100 through, for example, the processor 112 and other suitable software and/or hardware modules, determines that the color shift security feature is to be applied to the print job (at 506).

The clear colorant ink limiting feature of the DFE is turned off (at 508). It should be appreciated that clear colorant ink limiting features may be turned off completely in this scenario. However, as will be described in connection with additional or alternative scenarios below (e.g. FIGS. 6 and 7), the clear colorant ink limiting feature of the DFE may only be selectively turned off and on during the ripping and/or printing processes. Referring back to FIG. 5, once the processing is completed, the print job is printed (at 510) with the embedded color shift security feature by the printer or marking engine of the system.

Figure 6:
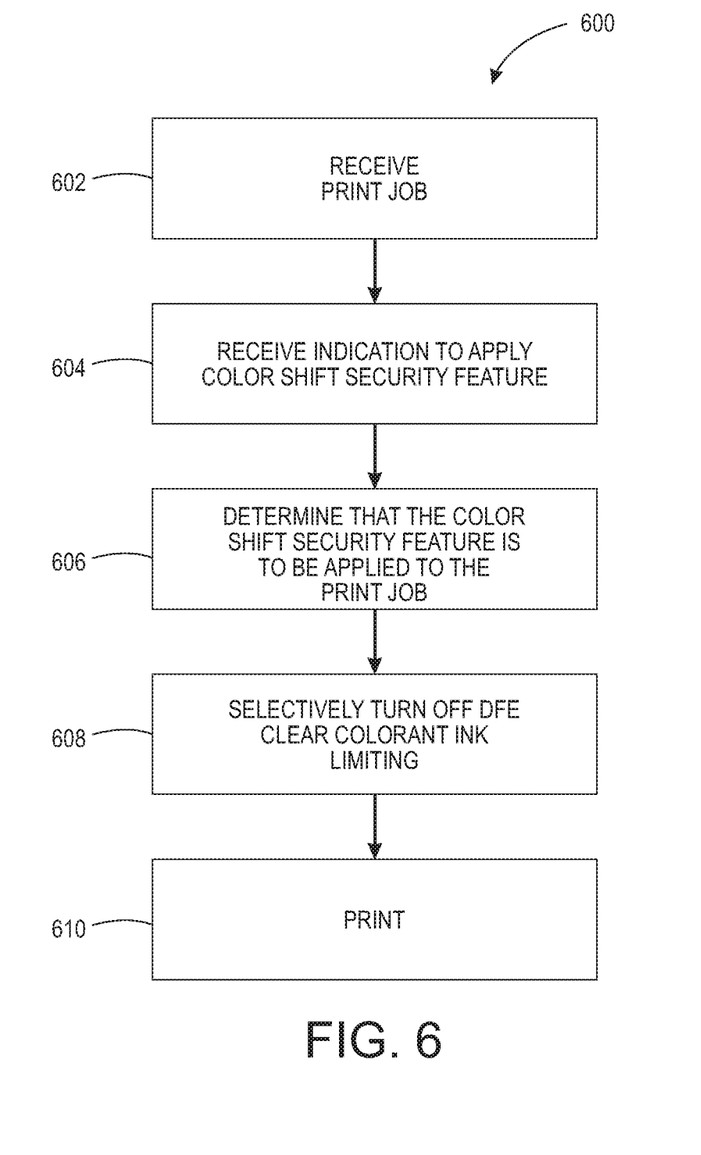
FIG. 6 is a flowchart illustrating a method according to the presently described embodiments; and, FIG. 7 is a flowchart illustrating a method according to the presently described embodiments.

In a second method or scenario, with reference now to FIG. 6, the DFE implements a determined number (e.g. at least one) of factory-defined or pre-defined Spot Color names. These names would be published and therefore known to persons creating PDLs for submission to the system. The names could take any form but, at least in one form, could be "Security Orange", "Security Brown", etc. The DFE factory definition would, in at least one form, internally include suitable formulas to best exploit the self limiting behaviors of the connected IOT. Certain of the defined security Spot Colors, in at least one form, could have 100% Clear as part of their formula. In this way, the DFE automatically applies Clear colorant over text or as a first string of text over or within a background color (as shown, for example, in FIGS. 3 and 4) without the PDL explicitly needing to specify a second Text string having a color of Clear. In this scenario, the clear colorant ink limiting feature would be turned off for Security Color or Spot Color pixels. The clear colorant ink limiting feature is turned on for other pixels. The advantages of this scenario are that the document creator does not control and therefore is not responsible for: a) knowing which color formulas must be included in the PDL to manipulate the printer behavior and b) including a repeated object. As shown in FIG. 6, an example method 600 commences upon receipt of a print job (at 602) and receipt of an indication to apply a color shift security feature to the print job (at 604). Next, the system 100 through, for example, the processor 112 and other suitable software and/or hardware modules, determines that the color security feature is to be applied to the print job (at 606). The clear colorant ink limiting feature is then selectively turned off based on the noted Spot Colors (at 608) and the job is printed (at 610) with the embedded color shift security feature by the printer or marking engine of the system.

Figure 7:
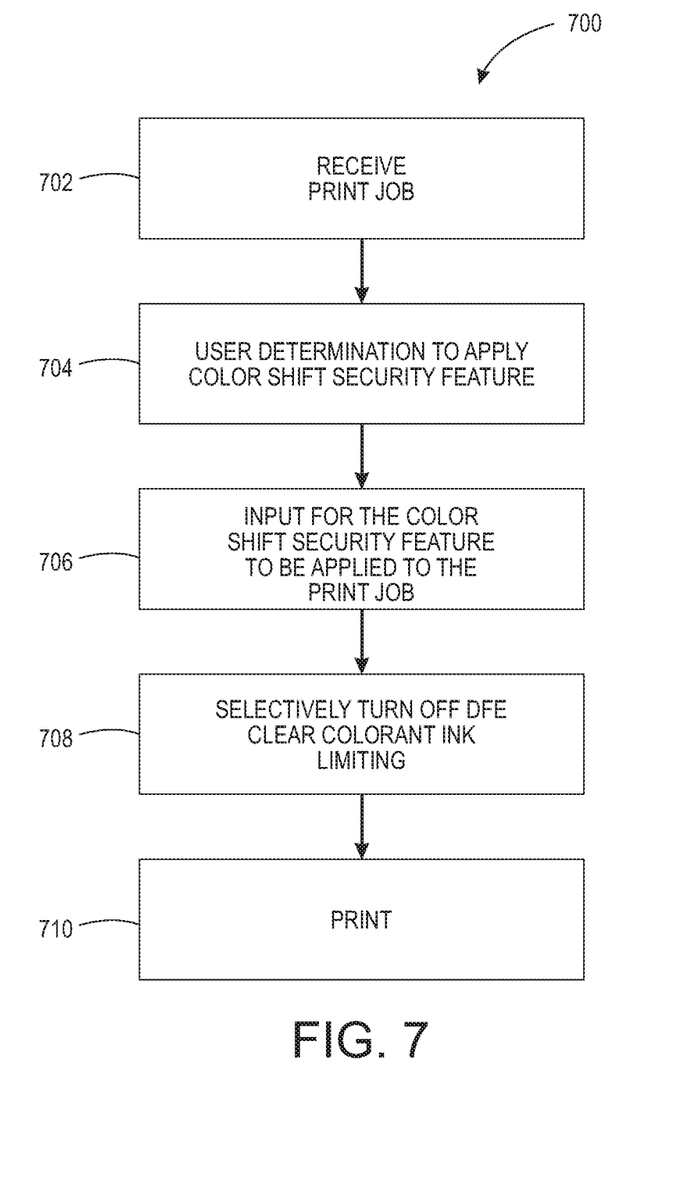

In a third method or scenario, the DFE implements a Security Annotation capability specified by the user, in at least one form, when the job is submitted or received at the DFE. The Security Annotation capability allows the user to add Security elements to an ordinary print job (i.e. one that wasn't specially constructed per scenario 1 (e.g. FIG. 5), or used special Spot Color names per scenario 2 (e.g. FIG. 6)). The DFE would allow selection of text string or objects, Security Spot Color combination, position on page, and other features so that the DFE could add the Security Annotation to the job as the DFE RIPs the job for printing. In this scenario, the security feature contemplated herein could be added to any document or print job with user input and certain functionality in the DFE. In this regard, for example, as shown in FIG. 7, an example method 700 commences upon receipt of an ordinary print job (at 702). A user then determines that a color shift security feature should be added to the print job (at 704). Through an interface or the like, the user inputs or selects parameters for the security feature by typing in text strings (such as those shown in FIG. 3 or 4) or selecting text strings or symbols from predetermined choices (at 706). The clear colorant ink limiting feature is then selectively turned off based on the input parameters (at 708) and the job is printed (at 710) with the color shift security feature by the printer or marking engine of the system.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A system for providing a color shift security feature to a print job, the system having self ink limiting behavior wherein ink across color separations is limited according to amounts of ink the system is capable of printing and including a clear colorant ink limiting feature, the system comprising:
   an input configured to receive the print job and an indication to apply the color shift security feature to the print job;
   a processor configured to implement the clear colorant ink limiting feature to prevent a shift in color hue by selectively reducing clear colorant ink for print jobs in accord with the self-ink limiting behavior of the system, determine that the color shift security feature is to be applied to the print job based on the indication, turn off the clear colorant ink limiting feature to implement the color shift security feature in the print job based on the determination, wherein turning off the clear colorant ink limiting feature results in a color combination to be printed that includes a clear colorant to selectively shift color hue; and,
   a marking engine configured to print the print job with the color shift security feature embedded therein.

2. The system as set forth in claim 1 wherein the processor is configured to turn off the clear colorant ink limiting feature for an entire print job.

3. The system as set forth in claim 1 wherein the color combination to be printed comprises at least one pre-defined spot color.

4. The system as set forth in claim 3 wherein the clear colorant ink limiting feature is selectively turned off only for the at least one pre-defined spot color.

5. The system as set forth in claim 4 wherein the clear colorant ink limiting feature is turned on for colors other than the at least one pre-defined spot color.

6. The system as set forth in claim 3 wherein the pre-defined spot color comprises a 100% clear component.

7. The system as set forth in claim 1 wherein the indication to apply the color shift security feature is added by a user.

8. The system as set forth in claim 1 wherein the system is a five-color printing system.

9. The system as set forth in claim 1 wherein the print job with the color shift security feature embedded therein facilitates a determination of authenticity, authorization, or security for the print job in subsequent renderings of the print job.

10. A method providing a color shift security feature to a print job, wherein a printer used for printing has self ink limiting behavior wherein ink across color separations is limited according to amounts of ink the printer is capable of printing and includes a clear colorant ink limiting feature to prevent a shift in color hue that selectively reduces clear colorant ink in print jobs in accord with self-ink limiting behavior of the system, the method comprising:

receiving the print job and an indication to apply the color shift security feature to the print job;

determining that the color shift security feature is to be applied to the print job based on the indication;

turning off the clear colorant ink limiting feature based on the determining to implement the color shift security feature in the print job, wherein turning off the clear colorant ink limiting feature results in a color combination to be printed that includes a clear colorant to selectively shift color hue; and,     printing the print job with the color shift security feature embedded therein.

11. The method as set forth in claim 10 wherein the selectively turning off comprises turning off the clear colorant ink limiting feature for an entire print job.

12. The method as set forth in claim 10 wherein the color combination to be printed comprises at least one pre-defined spot color.

13. The method as set forth in claim 12 wherein the selective turning off of the clear colorant ink limiting feature comprises turning off only for the at least one pre-defined spot color.

14. The method as set forth in claim 13 further comprising turning on the clear colorant ink limiting feature for colors other than the at least one pre-defined spot color.

15. The method as set forth in claim 12 wherein the pre-defined spot color comprises a 100% clear component.

16. The method as set forth in claim 10 further comprising adding the indication to apply the color shift security feature by a user.

17. The method as set forth in claim 10 wherein a printer used for printing is a five-color printing system.

18. The method as set forth in claim 10 further comprising subsequently rendering the print job such that the color hue shift is not perceivable, thus indicating that the subsequently rendered print job is unauthorized, inauthentic or insecure.

19. The system as set forth in claim 1 wherein the self-ink limiting behavior of the system is modeled in a destination profile employed by the system.

20. The method as set forth in claim 10 wherein the self-ink limiting behavior of the printer is modeled in a destination profile employed by the printer.

\* \* \* \* \*